United States Patent [19]

Hislop

[11] Patent Number: 5,613,318
[45] Date of Patent: Mar. 25, 1997

[54] SELF HOOKING ROD HOLDER WITH TRIGGER FLOAT

[76] Inventor: Dennis M. Hislop, P.O. Box 385, Houston, Ak. 99694

[21] Appl. No.: 369,654

[22] Filed: Jan. 6, 1995

[51] Int. Cl.⁶ ............................................. A01K 97/12
[52] U.S. Cl. ................................... 43/16; 43/21.2
[58] Field of Search .......................... 43/15, 16, 21.2

[56] References Cited

U.S. PATENT DOCUMENTS

| | | | |
|---|---|---|---|
| 1,831,190 | 11/1931 | Parker | 248/534 |
| 2,744,351 | 5/1956 | Smith | 43/16 |
| 2,781,600 | 2/1957 | McDonald | 43/15 |
| 2,804,277 | 8/1957 | Kinder | 43/15 |
| 2,811,801 | 11/1957 | Daniel | 43/15 |
| 2,918,746 | 12/1959 | Hamrick | 43/15 |
| 2,964,868 | 12/1960 | Bennett | 43/21.2 |
| 3,170,262 | 2/1965 | Hall | 43/15 |
| 3,837,109 | 9/1974 | De Julio | 43/15 |
| 4,461,113 | 7/1984 | Erwin | 43/15 |
| 5,044,596 | 9/1991 | Walczak | 43/21.2 |
| 5,163,652 | 11/1992 | King | 43/21.2 |
| 5,245,778 | 9/1993 | Gallegos et al. | 43/15 |
| 5,249,387 | 10/1993 | Slocum | 43/16 |

FOREIGN PATENT DOCUMENTS 1257292   2/1961   France ................................ 43/16

*Primary Examiner*—Joseph J. Hail, III
*Assistant Examiner*—James Miner

[57] ABSTRACT

Disclosed is a fishing rod holder including a spring loaded fishing rod mount that is attached to a retractable frame by means of a rotating cross member. The release mechanism, which also serves as part of the triggering device, which shall be known hereafter as the trigger release mechanism, consists of a pivotally mounted pre-formed metallic rod that retains a fishing pole in a spring loaded horizontal position. A trigger line is attached to the bottom portion of the trigger release mechanism and to a trigger float. The trigger float is comprised of low density foam with a retaining clip and trigger line attachment point. The trigger float is slidably attached to a fishing rod line. When the trigger float is moved sufficiently downward, tension on the trigger line rotates the trigger release mechanism from the top of the fishing rod urging the fishing rod by spring-force to move in a vertical direction from a horizontal cocked position.

6 Claims, 3 Drawing Sheets

SELF HOOKING ROD HOLDER WITH TRIGGER FLOAT

BACKGROUND OF THE INVENTION

1. Field of the Invention

The present invention relates basically to other self hooking rod holders. Where a fishing rod is held against spring-force in a set position. Then is released by the striking of a fish at the bait. More precisely the present invention has a unique collapsible self supporting frame with a self hooking device and trigger float.

2. Discussion of Prior Art

The prior art has many examples of spring loaded rod holders that employ the fishes own strike to activate the device and thus set the hook. Various examples of such devices can be found under U.S. Pat. Nos. 5,076,001 5,050,332 2,811,801 2,804,277 2,781,600 and 5,245,778. While these previous efforts may demonstrate their ability to achieve their goals there remains a need for improvement and for a device suitable for ice fishing. There also remains a need for a device that can except most all manner of fishing rods, the prior art is limited in this respect. The prior art also employs a ground stake that is not feasible for ice fishing. Another disadvantage of the prior art is a triggering mechanism that does not allow for adjustment to the pull of a biting fish.

OBJECTS AND ADVANTAGES

In view of the foregoing it is the intended purpose of the present invention to provide an improved self hooking rod holder that is suitable for ice fishing.

This invention will provide a simple multi-adjustable trigger and release mechanism.

A further object is to provide a device that will accept most all manner of fishing rods with either right of left handed reels.

Another advantage is a device which is responsive only to the pull of a biting fish, not to conditions of the elements.

And still further the present invention will provide a retractable frame that is free-standing, stable, lightweight, durable and easy to assemble. The frame being an integral part of the device.

Figure 1:
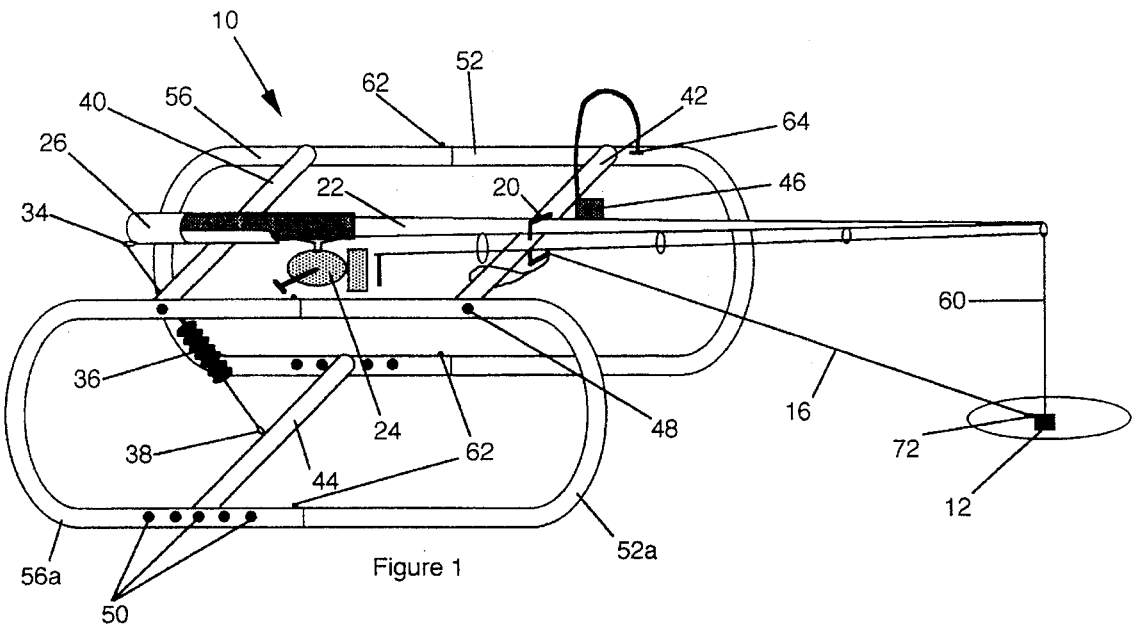
FIG. 1 shows a preferred embodiment of the present invention in the form of device 10 shown in the cocked, or set position.

| Reference Numerals in Drawings | |
| --- | --- |
| 10 device | 38 lower spring connection ring |
| 12 trigger float | 40 pivoting cross member |
| 14 trigger float retaining clip | 42 trigger housing cross member |
| 16 trigger line | 44 tension adjustment cross member |
| 18 adjustable trigger loop | 46 alert flag (or bell) |
| 20 trigger release mechanism | 48 wing nuts |
| 22 conventional fishing rod | 50 tension adjustment holes |
| 24 conventional fishing reel | 52 & 52a retractable support frames |
| 26 rod holder | 56 & 56a retractable support frames |
| 28 low density foam | 60 fishing line |
| 30 rod holder retaining pin | 62 spring lock pins |
| 32 keeper pin | 64 alert flag mounting slot |
| 34 upper spring connection ring | 68 threaded studs |
| 36 conventional coil spring | 70 partially threaded studs |
| | 72 trigger line anchor ring |

DESCRIPTION OF THE INVENTION FIGS. 1 TO 7

Figure 2:
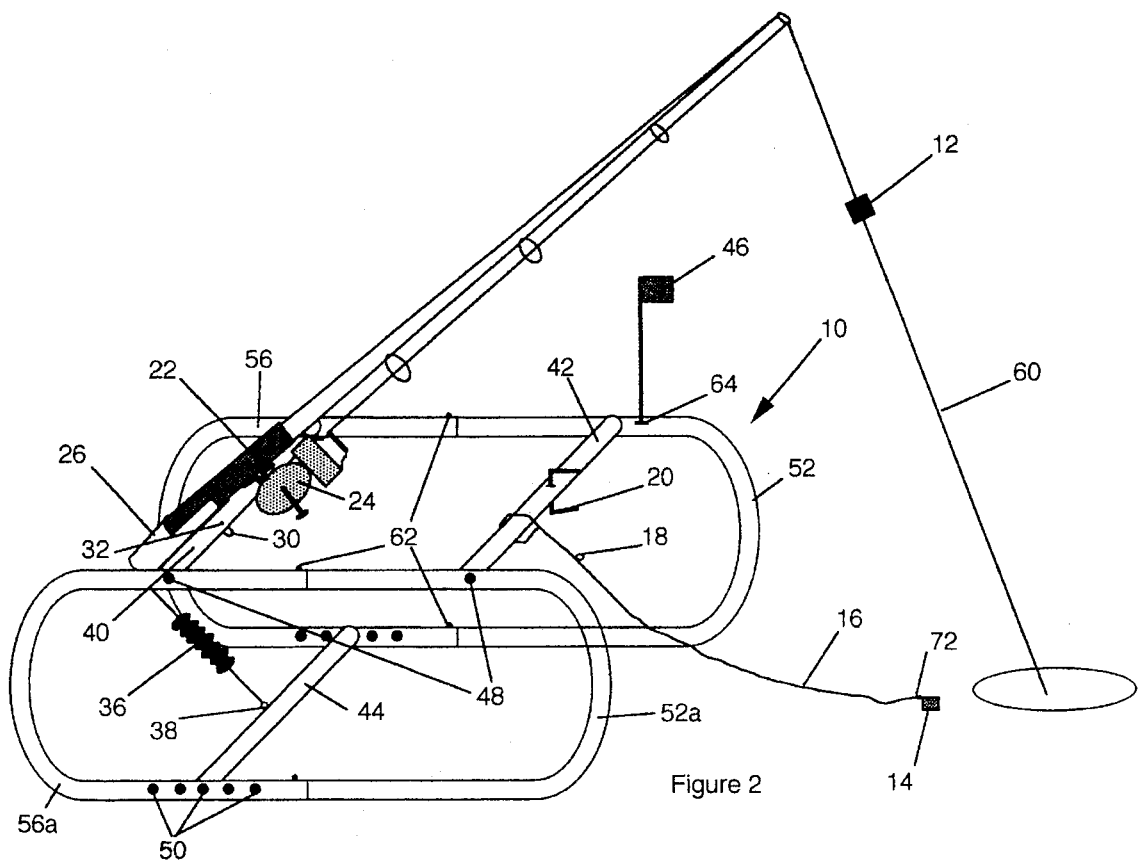
FIG. 2 shows a similar aspect of device 10 shown in the released position.

Referring now to the Drawings FIGS. 1 and 2 show preferred embodiments of the present invention in the form of device 10 shown in the cocked position (FIG. 1) and the released position (FIG. 2). The device is designed to releasably grasp a conventional fishing rod 22. That includes a conventional fishing reel 24. From which line 60 extends down from the end of fishing rod 22 to a trigger float 12. Where a trigger line 16 is attached to trigger float 12 at trigger float connection ring 72 and to trigger release mechanism 20 at adjustable trigger loop 18. Which when trigger line 16 is pulled with a predetermined amount of force device 10 will cause fishing rod 22 to be driven upward by spring-force 36.

Main components of device 10 include rod holder 26, retractable support frames 52,52a,56,56a. These components are preferably constructed of a light metallic tubing or durable plastic material using conventional techniques of the fabricating industry. However some of these components could be manufactured from wood.

Rod holder 26 includes a piece of tubing with low-density foam 28 lining the inside circumference of rod holder 26. Rod holder 26 is designed in a conventional manner to releasably grasp a conventional fishing rod 22 as shown in FIGS. 1 and 2.

Figures 3, 5:
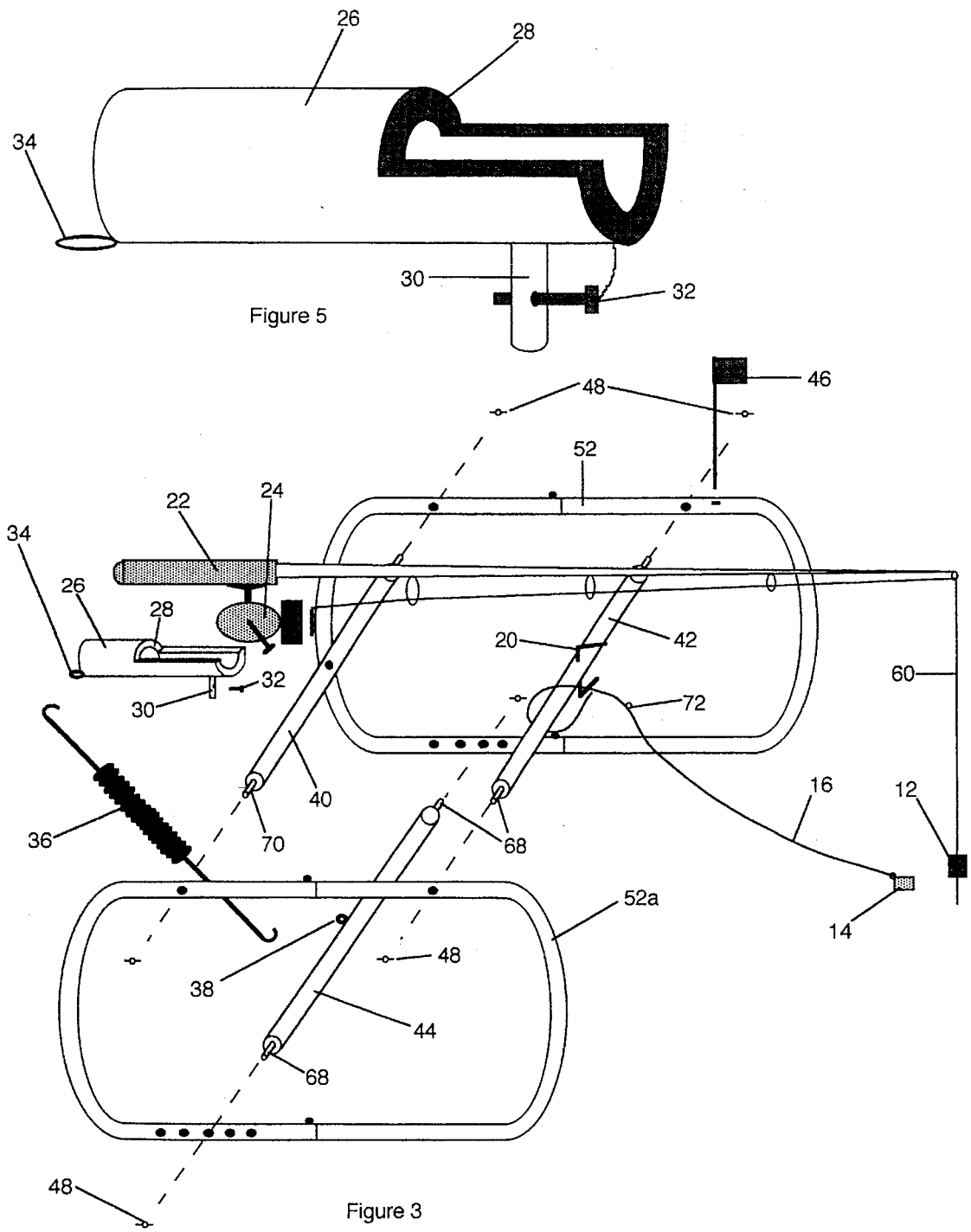
FIG. 3 shows an isometric exploded view of device 10
FIG. 5 shows a partially sectional view of the rod holder, a part of device 10.

Rod holder 26 is attached to pivoting cross member 40 by pin 30 and secured by keeper pin 32. Keeper pin 32 is then retained by keeper pin 32a as shown in FIG. 5.

Pivoting cross member 40 is attached to the upper rear sections of retractable support frames 52 and 52a by means of partially threaded studs 70 and retained by wing nut 48. The partially threaded studs 70 allow pivoting cross member 40 to rotate about its longitudinal axis. Spring 36 is a conventional coil spring attached in the anchor rings 34 and 38. Spring 36 is designed to rotate the rod holder 26 and the pivoting cross member 40 and fishing rod 22 about the axis of pivoting cross member 40. AS shown in FIGS. 1 and 2.

Fishing rod 22 is placed in rod holder 26 and lowered against spring-force 36 about the axis of pivoting cross member 40 to the horizontal position. Fishing rod 22 is then retained by rotating trigger mechanism 20 over the top of fishing rod 22. Trigger mechanism 20 passes through holes bored in the vertical center of trigger housing cross member 42. Trigger housing cross member 42 is attached to retractable support frames 56 and 56a by means of threaded studs 68 and secured by wing nut 48. As shown in FIG. 1.

An alert flag (or bell) 46 is placed in mounting slot 64 located in the top portion of retractable support frame 56. It is then bent against resilient force and lodged under fishing rod 22 as shown in FIG. 1. The alert flag support is constructed of a resilient material such as plastic or spring steel, but could be made from any variety of material with a memory and resilience.

FIG. 3 shows an exploded perspective view of the present invention. Including pole holder 26 that is constructed of suitable material of plastic or metal. It is lined with low density foam 28 and designed to releasably grasp fishing rod 22. Pole holder 26 is attached to pivoting cross member 40 by inserting rod holder retaining pin 30 through holes bored in the vertical center of pivoting cross member 40. It is then retained by keeper pin 32 that is inserted in holes bored through the horizontal centers of pivoting cross member 40 and rod holder retaining pin 32. This is then secured by placing keeper pin 32a in a hole bored through the end of keeper pin 32.

Fishing rod 22 includes fishing reel 24 with fishing line 60. Fishing line 60 extends down from the end of fishing rod 22 and passes through trigger float 12. Trigger float 12 is slidably attached to fishing line 60 by means of trigger float retaining clip 14. Trigger line 16 is attached to trigger float retaining clip 14 at trigger line anchor ring 72 and to trigger mechanism 20 at adjustable trigger loop 18. Trigger line 16 is then secured around trigger housing cross member 42.

Trigger housing cross member 42 has a hole bored through the vertical center through which passes trigger mechanism 20. Trigger mechanism 20 is pivoted over fishing rod 22 that has been lowered against spring-force.

Spring 36 is a conventional coil spring attached to spring connection rings 34 and 38. Lower spring connection ring 38 is attached to the center of tension adjustment cross member 44. Tension adjustment cross member 44 is attached to the lower portion of retractable support frames 52 and 52a at one set of five perpendicular holes and secured by wing nut 48. The five perpendicular holes are bored horizontally through the lower portions of retractable support frames 52 and 52a allowing for spring 36 tension adjustment.

The alert flag 46 (or bell) is inserted in alert flag mounting slot 64 located in the upper portion of retractable support frame 56.

Figure 4:
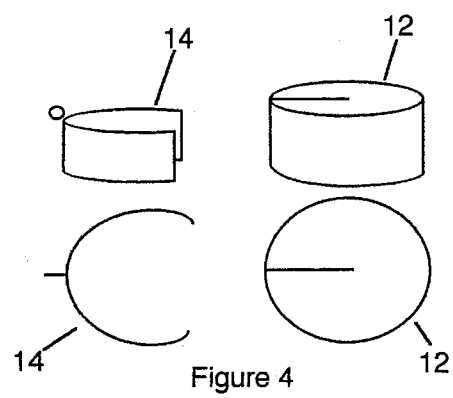
FIG. 4 shows the float portion of the triggering mechanism, a part of device 10.

FIG. 4 best shows trigger float 12 and trigger float retaining clip 14 a portion of device 10. Trigger float 12 is preferably constructed of a cylindrical section of low density foam, but could be made from cork or wood. There is a longitudinal slice to the center of trigger float 12 allowing it to slide over conventional fishing line. Trigger float retaining clip 14 is constructed of a resilient material and designed to fit snugly over trigger float 12. There is an anchor ring 72 attached to the top portion of trigger float retaining clip 14 for attachment of trigger line 16.

FIG. 5 best shows rod holder 26 a main component of device 10. Rod holder 26 is preferably constructed a suitable metallic or plastic tubing. Low density foam 28 lines the inside circumference of rod holder 26 and is designed to releasably hold a conventional fishing rod. Pin 30 is threadily attached to the base of rod holder 26 near the front. There is a hole bored through pin 30 aligned with holes bored horizontally through pivoting cross member 40. Keeper pin 32 is inserted through the holes bored in pivoting cross member 40 and pin 30 effectively securing rod holder 26 to pivoting cross member 40. Keeper pin 32a is inserted in a hole bored in the end of keeper pin 32 securing it in place. Attached to the base of rod holder 26 is upper spring attachment ring 34 as seen in FIG. 5.

Figure 6:
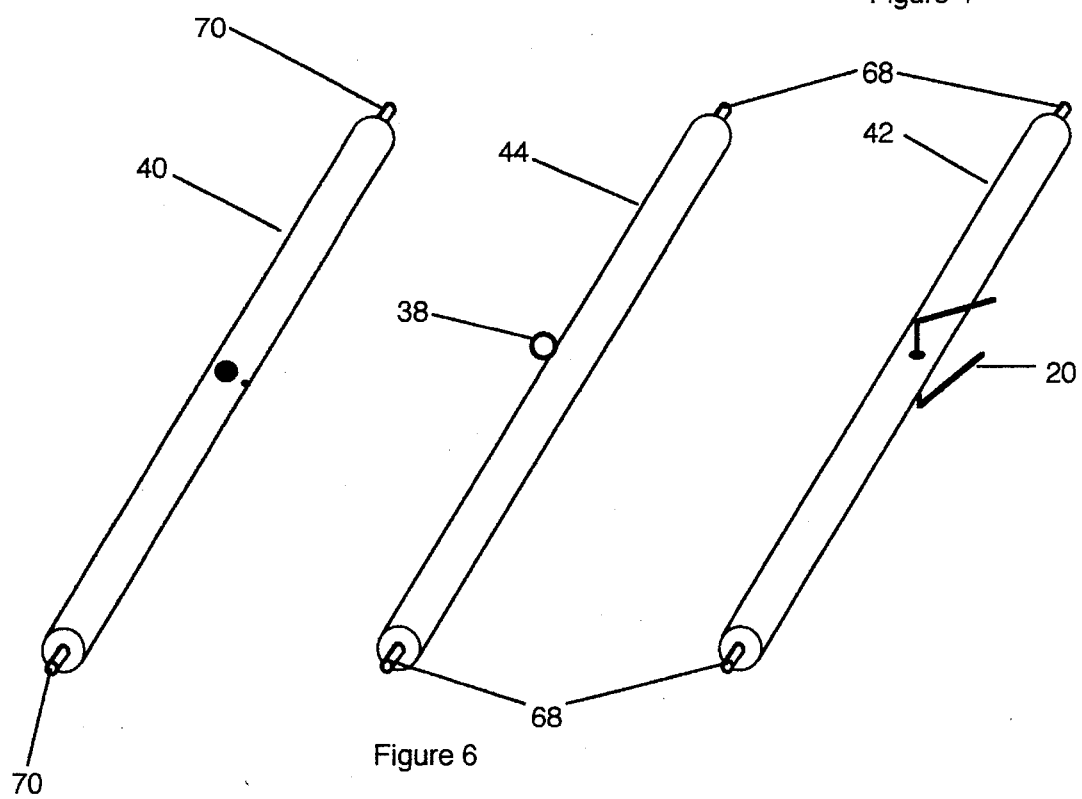
FIG. 6 shows a detailed view of the cross members of device 10.

FIG. 6 shows a perspective view of pivoting cross member 40, trigger housing cross member 42 and tension adjustment cross member 44.

Pivoting cross member 40 has two partially threaded studs attached to both ends of pivoting cross member 40. A large diameter hole is bored through the vertical center of pivoting cross member 40, and a small diameter hole is bored through the horizontal center.

Trigger housing cross member 42 has a small diameter hole bored through the vertical center through which passes trigger mechanism 20. Trigger mechanism 20 is comprised of a metallic rod with two horizontal planes connected by a vertical plane. The two horizontal planes being offset to each other by a few degrees. Attached at opposite ends of trigger housing cross member 42 are two threaded studs 68 for attachment.

Tension adjustment cross member 44 has threaded studs 68 attached at both ends, and lower spring anchor ring 38 attached to the center of tension adjustment cross member 44.

Let it be understood that partially threaded studs 70 and threaded studs 68 are attached to their respective cross members by any variety of effective means used in the fabricating industry.

Figure 7:
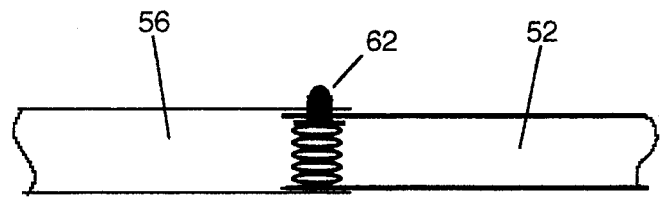
FIG. 7 shows a partial sectional view of the retractable frames of device 10.

FIG. 7 best shows the re tractability feature of the retractable support frames, a main component of device 10. Retractable support frames 52 and 52a are constructed of a tubular material with diameters slightly larger then retractable support frames 56 and 56a allowing the two tubular sections to be slid together. There are holes bored in the upper portion of retractable support frames 52, 52a, 56 and 56a near the open end.

A spring pin 62 is placed in the open ends of retractable support frames 56 and 56a with the top portion of spring pin 62 extending above the surface through the holes bored in the ends of retractable support frames 56 and 56a. When retractable support frames 56 and 56a are slid inside the larger diameter of retractable support frames 52 and 52a. The portion of spring pin 62 extending above the surface will lodge in the holes bored in the ends of retractable support frames 52 and 52a effectively locking them together.

By depressing spring pin 62 retractable support frames 56 and 56a can be slidably retracted into retractable support frames 52 and 52a for storage.

While a particular form of the invention has been described here it is not intended that the invention be limited to the pervious drawings. Since modifications and changes may readily occur to those skilled in fabrication without departing from the invention. Therefore it is aimed to cover all changes and modifications that fall within the spirit of the invention as described in the claims that follow.

What is claimed is:

1. A self hooking fishing rod holder, said holder comprising:

a free standing frame comprising opposing side portions, said side portions attached by a forward cross section member and a rearward cross section member;

a tubular rod holder for releasably retaining a fishing rod, said rod holder pivotally mounted on said rearward cross section member, said rod holder and rod pivotable between a first horizontal position and a second raised position;

spring means mounted on said rod holder, said spring means attached to said frame, said spring means providing means to pivot said rod holder and rod from said first position to said second position;

a trigger line secured to said frame at a first end, said trigger line secured to a retaining clip at an other end, said retaining clip releasably grasping a trigger float, said trigger float providing means for releasably retaining a fishing line;

release means mounted to said forward cross section member, said release means comprising an upper arm and a lower arm and said arms being rotatable between a retaining position and a releasing position, said upper arm for retaining said rod holder and rod in said first position and said lower arm for releasably retaining said trigger line;

whereby said fishing line is positioned within said trigger float and upon a pull on said fishing line said release means is rotated from said retaining position to said releasing position.

2. The self hooking fishing rod holder as set forth in claim 1 further comprising a lower cross section member, said lower cross section member removably attached to and connecting a lower portion of said opposing side portions, and wherein said spring means is attached to said lower cross section member.

3. The self hooking fishing rod holder as set forth in claim 2 wherein said lower portion of said opposing side portions comprises a plurality of holes, said holes adapted to support said lower cross section member whereby the position of said lower cross section member with respect to said opposing side portions may be changed.

4. The self hooking fishing rod holder as set forth in claim 3 wherein opposing ends of said lower cross section member comprise threaded studs, said threaded studs positioned in said holes and secured in said holes by a respective nut.

5. The self hooking fishing rod holder as set forth in claim 1 wherein said tubular rod holder comprises an inside circumference, and said inside circumference is lined with foam.

6. The self hooking fishing rod holder as set forth in claim 1 and further comprising a signal flag, said signal flag adapted to be releasably positioned adjacent said rod when said rod holder and rod are in said first horizontal position.

\* \* \* \* \*